July 18, 1967 D. R. WEBSTER ET AL 3,332,033

BASE DRIVE CIRCUIT FOR VOLTAGE-CONTROLLED TRANSISTOR SATURABLE REACTOR OSCILLATOR

Filed Oct. 11, 1965

WITNESSES:

Bernard R. Gieguez

James F. Young

INVENTORS
Donald R. Webster and
Harold D. Ausfresser.
BY E. F. Possessky

ATTORNEY

United States Patent Office 3,332,033
Patented July 18, 1967

3,332,033
BASE DRIVE CIRCUIT FOR VOLTAGE-CONTROLLED TRANSISTOR SATURABLE REACTOR OSCILLATOR

Donald R. Webster, Hyattsville, and Harold D. Ausfresser, Baltimore, Md., assignors to Westinghouse Electric Corporation, Pittsburgh, Pa., a corporation of Pennsylvania
Filed Oct. 11, 1965, Ser. No. 494,363
7 Claims. (Cl. 331—113)

ABSTRACT OF THE DISCLOSURE

An oscillator includes a pair of transistors and a saturable reactor having an output winding and a D.C. voltage input winding connected in the transistor collector-emitter circuits. Respective circuits supply currents for transistor base drive with drive current magnitude held substantially constant independently of reactor input voltage. Separate reactor control windings respectively and alternatively divert the drive currents from the transistors to produce on and off cycling of the transistors at a rate linearly dependent on the input voltage magnitude over a wide range of magnitudes The present invention relates to voltage controlled oscillators and more particularly to semiconductor switch-saturable reactor-oscillator circuits.

Figure 1:
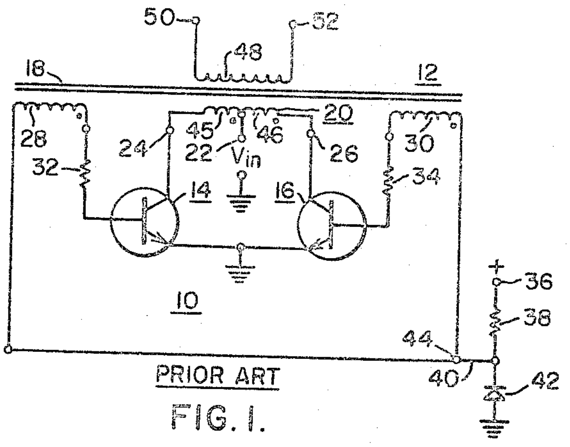
PRIOR ART FIG. 1.

Generally, voltage controlled oscillators produce an output having a frequency which varies as a function of the magnitude of input voltage. Voltage controlled oscillators can thus be used where it is desired to control the rate at which a variable changes in response to the magnitude of another variable. For example, as described in a copending application, entitled "Multiphase Clock Control System for Machine Tools," Ser, No. 485,373, filed by J. Patrick on Sept. 7, 1965 and assigned to the present assignee, a voltage controlled oscillator can be used to control the rate at which incremental workpiece movement is made toward a machining position in response to the magnitude of the position error.

In a typical low cost semiconductor switch or transistor-saturable reactor-oscillator, such as the inverted shown in U.S. Patent 2,783,384 by R. L. Bright et al., a pair of transistors have collector-emitter circuits connected to a voltage input winding of a saturable reactor and base-emitter circuits connected to respective bias control windings of the same reactor. A reactor output winding produces an oscillatory voltage waveform as the transistors alternately conduct and cut off in response to the application of DC voltage to the reactor input winding. To assure circuit start-up, a starting bias voltage can be applied to the base-emitter circuits of both transistors so that both transistors are conductive when an input voltage is first applied to the reactor input winding.

The conventional low cost voltage controlled oscillator has an operating limitation created by the limited range over which output frequency varies as a substantially linear function of reactor input voltage. In the operation of the oscillator, the base current and the maximum collector current are dependent on the reactor input voltage thereby causing the reactor core flux density at which flux reversal occurs to be a function of reactor input voltage. In turn, a nonlinear relation is produced between reactor input voltage and oscillator frequency.

Another operating limitation is created by the minimum value of reactor input voltage that can be used to initiate oscillations for any preselected reactor and transistor designs. More generally, the operating voltage ratio of maximum to minimum reactor input voltages is limited in the conventional voltage controlled oscillator. The maximum to minimum operating voltage ratio, hereinafter referred to as the operating voltage ratio, can in turn be limited indirectly by nonlinearity of the circuit response characteristic if linear response is required in a particular applicaton.

In accordance with the principles of the present invention, a semiconductor switch or transistor-saturable reactor-oscillator is arranged to operate with an improved operating voltage ratio and with improved linearity. The oscillator comprises a pair of semiconductor switches or transistors having collector-emitter circuits connected to a voltage input winding of a saturable reactor and base-emitter circuits connected to respective control windings of the same reactor. A reactor output winding produces an oscillatory voltage waveform as the transistors alternately conduct and cut off in response to the application of DC voltage to the reactor input winding. The oscillator circuit includes additional components and is otherwise arranged to make the magnitude of transistor base current substantially independent of the magnitude of reactor input voltage and to increase the sensitivity with which the flow of base-emitter current is controlled. Since the base current is substantially independent of the reactor input voltage, the transistor dissipation remains at a constant low level independent of the reactor input voltage.

It is therefore an object of the invention to provide a novel low cost voltage controlled oscillator which operates with an improved operating voltage ratio.

Another object of the invention is to provide a novel low cost voltage controlled oscillator which operates with improved linearity of response.

A further object of the invention is to provide a novel low cost voltage controlled oscillator which operates with substantially constant and relatively low transistor base current dissipation.

Figure 2:
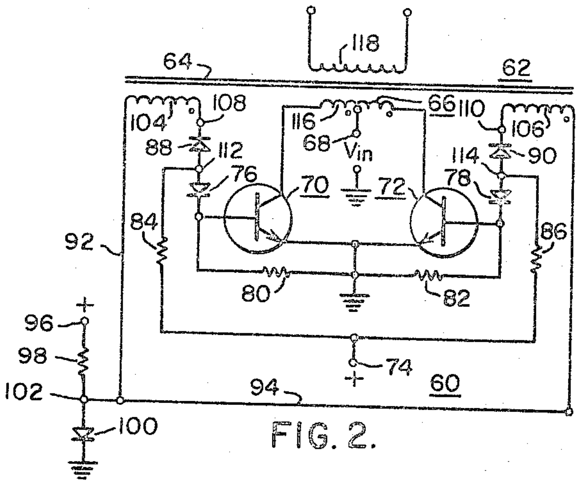

These and other objects of the invention will become more apparent upon consideration of the following detailed description along with the attached drawing in which:

FIGURE 1 shows a schematic diagram of a typical prior art voltage controlled oscillator; and FIG. 2 shows a schematic diagram of a voltage controlled oscillator circuit arranged in accordance with the principles of the invention.

There is shown in FIG. 1 a conventional astable voltage controlled oscillator 10 comprising a saturable reactor 12 and a pair of transistors 14 and 16. The saturable reactor 12 comprises a core 18 made from highly permeable or "square loop" magnetic material and a plurality of windings inductively coupled through the core 18. An input voltage winding 20 has a center tap 22 to which a DC input votage $V_{in}$ is applied, and it has end terminals 24 and 26 connected respectively to the collector-emitter circuits of the transistors 14 and 16. Collector current return to the input voltage winding 20 is provided through a ground or common connection.

Base-emitter voltage across the transistors 14 and 16 is controlled respectively through resistors 32 and 34 by control windings 28 and 30. To assure start-up, a bias voltage is applied across the base-emitter PN junction of each transistor 14 or 16 by a voltage source 36 connected through a resistor 38 to a common base current return path 40 for the two base-emitter circuits. A diode 42 directs base-emitter current flow and holds the potential at circuit junction 44 after oscillations commence. During oscillatory operation, base-emitter voltages of the transistors 14 and 16 are determined by the added influence of induced voltages in the control windings 28 and 30.

Before the voltage $V_{in}$ is applied to the winding 20, both transistors 14 and 16 are conductive due to the starting base-emitter bias voltage. When $V_{in}$ is applied, differential interturn capacitance and/or other factors cause more current to flow through one half of the the input voltage winding 20 than through its other half. One of the control windings 28 or 30 accordingly develops a voltage which drives the associated transistor 14 or 16 toward a non-conductive state and the other control winding drives the other transistor toward a more conductive state.

For example, as signified by the polarity dots, excess current flow in winding portion 45 as compared to winding portion 46 creates a core flux which induces reverse bias voltage in the control winding 30 to drive the transistor 16 toward a nonconductive state and which induces a forward bias voltage in the control winding 28 to drive the transistor 14 toward a more conductive state. As the collector current rises in the transistor 14 and the collector current cuts back in the transistor 16, the difference between the currents in the winding portions 45 and 46 increases to increase the forward drive applied to the transistor 14 and to increase the cut off applied to the transistor 16. When the reactor core 18 becomes saturated, collector current in the transistor 14 stops increasing due to limited base current flow, and the control voltage induced in the winding 28 drops to zero causing the collector current in the transistor 14 to start decreasing. As the core magnetic flux drops slightly, a reverse bias voltage is induced in the control winding 28 and a forward bias voltage is induced in the control winding 30. The transistor 14 is then driven to its cut off point and the transistor 16 is driven to a conductive state. The circuit 10 repeats the described cycle and continues to oscillate so long as $V_{in}$ is applied.

An output winding 48 is coupled to the core 18 to provide an output voltage at terminals 50 and 52. The frequency of the output voltage is a function of the magnitude of the input voltage $V_{in}$ and other fixed parameters such as the various turns ratios and the transistor characteristic curves.

Since the respective base-emitter currents equal the respective currents through the control windings 28 and 30, the transistor drive currents are directly dependent on the magnitude of $V_{in}$. The average transistor drive current can thus be high to result in relatively high dissipation. Since the transistor base current determines the maximum collector current according to the nonlinear transistor characteristic curve, the maximum collector current is proportional to the input voltage magnitude. The core flux density at which the collector current stops increasing thus varies with the input voltage. Accordingly, output frequency is not precisely proportional to the input voltage magnitude.

Furthermore, the minimum voltage which will initiate oscillations is limited for any predetermined circuit design and hence limits the maximum to minimum operating voltage level to low values, usually about 10 to 1. The source 36 and the resistor 38 function to provide current to the bases of the transistors 14 and 16 through the windings 28 and 30 and the resistors 32 and 34 and thereby maintain both transistors in conduction before startup. The input voltage $V_{in}$ must be of sufficient magnitude to reduce the base current into the transistor 14 or 16 to zero by inducing a voltage in the windings 28 and 30. The induced voltage must be larger than the starting potential at the junction 44, typically 2 volts or more. During subsequent oscillatory circuit operation, the resultant potential at the junction 44 may be equal to about −0.7 volt. A certain minimum magnitude voltage $V_{in}$ is required to establish the minimum control voltage of 2.0 volts required in the winding 28 or 30 to start the oscillatory circuit operation.

In FIG. 2, there is shown a preferred embodiment of the present invention. A relatively low cost voltage controlled oscillator 60 comprises a saturable reactor 62 having a square loop core 64 and a plurality of windings inductively coupled through the core 64. An input voltage winding 66 has an intermediately located tap 68, preferably at the midpoint where a DC input voltage $V_{in}$ is applied. End terminals of the winding 66 are connected respectively to switchable paths or collector-emitter circuits of semiconductor switches or transistors 70 and 72. Collector current return to the input voltage winding 66 is provided through a ground or common connection.

Forward base-emitter voltage across the transistors 70 and 72 is established by substantially constant drive current flow from a voltage source 74 through a directing diode 76 or 78 and a resistor 84 or 86 and the associated base-emitter PN junction. Resistors 80 and 82 drop the supply voltage to a suitable operating value. Reverse base-emitter voltage is developed when supply current is diverted through a diode 88 or 90 and an alternate ground or common shunt return path 92 or 94 to the voltage supply 74.

Another voltage source 96 drives current through resistor 98 and return diode 100 to provide an offset potential at junction 102. The diodes 88 and 90 are both reverse biased prior to start-up of oscillations to an extent just sufficient to direct current from the source 74 through diodes 76 and 78 and make both transistors 70 and 72 conductive.

Control windings 104 and 106 of the reactor 62 are respectively in the shunt return paths 92 and 94 to control the voltage applied across the shunt diodes 88 and 90. With slight voltage induction in the winding 104 or 106, the potential at junction 108 or 110 becomes sufficiently negative in relation to junction 112 or 114 to divert current from the supply 74 through the shunt return path 92 or 94 and cut off the transistor 70 or 72.

In operation, the transistors 70 and 72 are both conductive until $V_{in}$ is applied to the input voltage winding 66. One of the two winding portions draws more current than the other to produce a control voltage of transistor cut off polarity in one of the control windings 104 or 106 and a control voltage of transistor conduction polarity in the other control winding. For example, more current may flow through winding portion 116 to induce a voltage of transistor cut off polarity in control winding 106 and a voltage of transistor conduction polarity in the control winding 104. When the induced voltage in the control winding 106 drives the potential of the junction 110 sufficiently below that of the junction 114, current is shunted from the diode 78 and the transistor 72 is driven to a non-conductive state. Conversely, the transistor 70 continues in its conductive state with substantially constant base current and increasing collector current since the diode 88 remains reverse biased.

In order to shunt the supply current from the diode 76 or 78 to the diode 88 or 90 when the offset voltage at junction 102 is just sufficient to prevent current flow through the diode 88 or 90, relatively small induced voltage is only required in the control winding 104 or 106. For example, 0.1 volt or less is sufficient. Accordingly, the circuit 60 initiates oscillations with improved sensitivity since a relatively small magnitude for $V_{in}$ is sufficient to develop the small control voltage needed to divert base drive current from one of the transistors 70 or 72. For preselected reactor and transistor designs, the voltage operating ratio of the circuit 60 is significantly improved to values as high as 60 to 1 or higher.

When the collector current of the transistor 70 rises to the value limited by the constant base current flow, the voltages induced in the control windings 104 and 106 decay to zero and reverse as the core flux rate of change decays to zero and reverses, and the transistor 70 is driven to cut off as the transistor 72 is driven to a conductive state. The transistor 70 becomes non-conductive when the shunt diode 88 becomes forward biased as a result of the reverse voltage induced in the control winding 104. When the collector current through the transistor 72 reaches its limiting value, the described cycle of operation is repeated and continues to be repeated so long as $V_{in}$ is applied to the input voltage winding 66. An output winding 118 coupled to the core 64 produces a voltage output having a frequency which varies as a function of the magnitude of the input voltage $V_{in}$.

Since the base drive current for the transistors 70 and 72 is substantially constant prior to the initiation of oscillations and during the alternate conduction periods of the transistors 70 and 72 in the oscillatory mode of circuit operation, relatively reduced dissipation is readily obtained by presetting the value of the base drive current consistently with the allowance of the flow of a core saturating collector current in the two transistors. Improved linearity of circuit response is obtained since base drive current is substantially independent of the input voltage $V_{in}$ and thereby maintains the maximum collector current constant to avoid variations in the core flux density at which the collector current stops increasing. The invention thus provides an improved voltage operating ratio as well as generally improved performance in a low cost oscillatory circuit arrangement.

A sample circuit was operated over an input voltage range of 0.3 volt to 20 volts. The resultant output voltage had a frequency range of 1.5 cycles per second to 100 cycles per second. Performance was satisfactory over the ambient temperature range of $-10°$ centigrade to $+80°$ centigrade.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A voltage controlled oscillator circuit having a saturable reactor with respective input winding means and an output winding, said circuit comprising a pair of semiconductor switches respectively having switchable paths series connected with the respective input winding means and an input voltage source, a pair of control windings on the saturable reactor to generate voltages of predetermined polarity in response to flux changes produced by current flow in the input winding means, means independent of said control windings for supplying drive current to each of said switches so as normally to drive both of said switch paths to a conductive state, and means responsive to each of said control windings for alternately and repeatedly diverting drive current from said switches when input voltage is applied to the input winding.

2. A voltage controlled oscillator circuit as set forth in claim 1 wherein said switches are transistors and said drive current supplying means includes respective drive circuits connected to the transistor base and emitter terminals and operable from another voltage source to supply respective substantially constant base drive currents.

3. A voltage controlled oscillator circuit as set forth in claim 1 wherein said responsive means includes respective shunt circuits connected to said drive current supplying means, said control windings are respectively connected in series in said shunt circuits, and means are provided for blocking current flow in said shunt circuits until a predetermined control winding voltage is developed.

4. A voltage controlled oscillator circuit as set forth in claim 2 wherein each of said drive circuits comprises a resistor and a current directing diode connected in series with said other voltage source, and respective other resistors are connected across the respective base and emitter terminals sets.

5. A voltage controlled oscillator circuit as set forth in claim 2 wherein said responsive means includes respective shunt circuits connected to said drive circuits, said control windings are respectively connected in series in said shunt circuits, and means are provided for blocking current flow in said shunt circuits from said drive circuits until a predetermined control winding voltage is developed.

6. A voltage controlled oscillator circuit as set forth in claim 3 wherein said blocking means includes a current directing diode in each of said shunt circuits and means for establishing an offset potential in each of said shunt circuits so as normally to bias the associated diode in the reverse direction.

7. A voltage controlled oscillator circuit as set forth in claim 5, wherein each of said drive circuits comprises a resistor and a current directing diode connected in series with said other voltage source, respective other resistors are connected across the respective base and emitter terminals sets, and said blocking means includes a current directing shunt diode in each of said shunt circuits and means for establishing an offset potential in each of said shunt circuits so as normally to bias the associated shunt diode in the reverse direction.

References Cited

UNITED STATES PATENTS 3,067,378 12/1962 Paynter ---------- 313—113 X
3,281,716 10/1966 Brown ------------- 331—113

FOREIGN PATENTS 917,609 2/1963 Great Britain.

ROY LAKE, *Primary Examiner.*

S. H. GRIMM, *Assistant Examiner.*